United States Patent Office 3,523,941
Patented Aug. 11, 1970

1

3,523,941

BENZODIAZEPINE COMPOUNDS AND PROCESS FOR THEIR PREPARATION

Willy Leimgruber, Cedar Grove, and Fausto Eugenio Schenker, Bloomfield, N.J., assignors to Hoffmann-La Roche Inc., Nutley, N.J., a corporation of New Jersey No Drawing. Continuation-in-part of application Ser. No. 598,608, Dec. 2, 1966. This application Mar. 6, 1967, Ser. No. 620,618
Int. Cl. C07d 27/30
U.S. Cl. 260—239.3 27 Claims

ABSTRACT OF THE DISCLOSURE

Compounds of the formula:

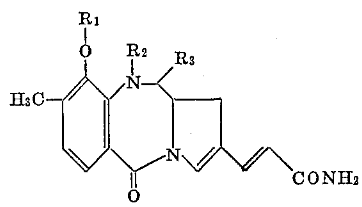

wherein $R_1$ is selected from the group consisting of H, acyl, carbamoyl and alkoxycarbonyl; $R_2$ is selected from the group consisting of hydrogen and acyl; and at least one of $R_1$ and $R_2$ is a substituent other than hydrogen; $R_3$ is selected from the group consisting of alkoxy, hydroxy and acyloxy, $R_2$ and $R_3$ taken together can be a chemical bond, displaying chemotherapeutic properties, displaying activity as an antiprotozoal, anthelmintic and antitumor agent.

RELATED APPLICATIONS

This application is a continuation-in-part of applicants' copending application Ser. No. 598,608, filed Dec. 2, 1966 and now abandoned.

SUMMARY OF THE INVENTION

This invention relates to a novel class of compounds displaying chemotherapeutic properties and processes for their preparation. More particularly, this invention relates to pyrrolo benzodiazepine acrylamide compounds of the formula:

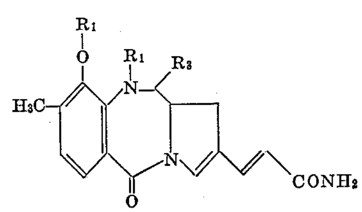

2 wherein $R_1$ is selected from the group consisting of H, acyl, carbamoyl and alkoxycarbonyl; $R_2$ is selected from the group consisting of hydrogen and acyl; and at least one of $R_1$ and $R_2$ is a substituent other than hydrogen; $R_3$ is selected from the group consisting of alkoxy, hydroxy and acyloxy, $R_2$ and $R_3$ taken together can be a chemical bond.

As used here in Formulas I and II, alkyl is an alkyl radical containing from 1 to 6 carbon atoms inclusive; acyl is benzoyl or alkanoyl containing from 1 to 6 carbon atoms inclusive; carbamoyl represents a carbamoyl radical in which the nitrogen atom is substituted with a phenyl radical or an alkyl radical containing from 1 to 6 carbon atoms inclusive; alkoxycarbonyl is an alkoxycarbonyl radical in which the alkoxy portion contains from 1 to 6 carbon atoms inclusive; alkoxy is an alkoxy radical containing from 1 to 6 carbon atoms inclusive and acyloxy is an acyloxy radical containing from 1 to 6 carbon atoms inclusive.

DETAILED DESCRIPTION OF THE INVENTION

Compounds represented by Formula I display chemotherapeutic activity and are useful as antitumor agents, e.g., they are active against Sarcoma 180 and Ehrlich solid tumors in mice, antiprotozoal agents, e.g., against *Endamoeba histolytical* and *Trichomonas vaginalis* and enthalmintic agents, e.g., against *Syphacia obvelata*. They can be administered orally or by injection, e.g., in the form of an aqueous solution intravenously. Intravenous dosages can be as little as about 0.01 mg./kg. animal body weight and oral doses can be about 0.2 mg./kg. animal body weight, with the dosage adjusted to species and individual requirements.

The compounds of Formula I can be administered internally in the form of conventional pharmaceutical preparations, for example, they can be administered in conventional enteral or parenteral pharmaceutical excipients containing organic and/or inorganic inert carriers, such as water, gelatin, lactose, starch, magnesium stearate, talc, plant oils, gums, alcohol, Vaseline or the like. The pharmaceutical preparations can be in conventional solid forms, for example, tablets, dragees, suppositories, capsules or the like, or conventional liquid forms, such as suspensions, emulsions or the like. If desired, they can be sterilized and/or contain conventional pharmaceutical adjuvants, such as preservatives, stabilizing agents, wetting agents, emulsifying agents, buffers or salts used for the adjustment of osmotic pressure. The pharmaceutical preparations can also contain other therapeutically active materials.

The compounds represented by Formula I are particularly advantageous since minimal irritant and necrotizing effects occur as a result of their utilization, e.g., swelling, edema, hemorrhage and necrosis are minimal or nonexistent at the site of intravenous injections of these compounds.

A subgenus of compounds within this invention which are particularly advantageous in lacking irritant and necrotizing properties and in being useful as antitumor agents are represented by the following:

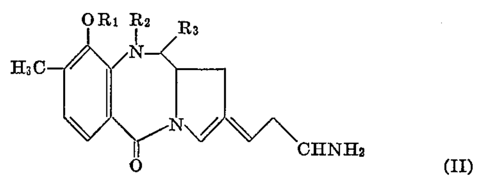

wherein $R_1$ is acyl; $R_2$ is hydrogen or taken together with $R_3$ is a chemcal bond and $R_3$ is alkoxy.

A known pyrrolo benzodiazepine acrylamide compound which is chemotherapeutically active, e.g., (11R: 11aS) - 5,10,11,11a - tetrahydro - 9-hydroxy-11-methoxy-8 - methyl - 5 - oxo-1H-pyrrolo[2,1-c][1,4]benzodiazepine-2-trans-acrylamide perpesented by the formula:

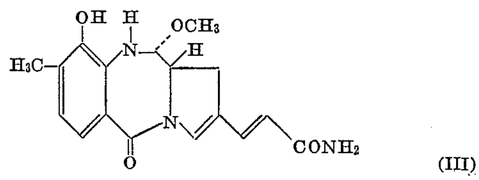

is known to be useful as an antitumor agent, e.g., active against Sarcoma 180 and Ehrlich solid tumors in mice. However, this compound and known derivatives thereof are very difficult to work with, particularly in instances when they are applied by injection since severe local tissue irritation and necrosis is produced at the site of the injection.

The compounds of this invention have been found to possess biological activity similar to that of the known pyrrola benzodiazepine acrylamides but do not exhibit tissue irritant properties.

The most preferred compound of this invention, represented by the formula:

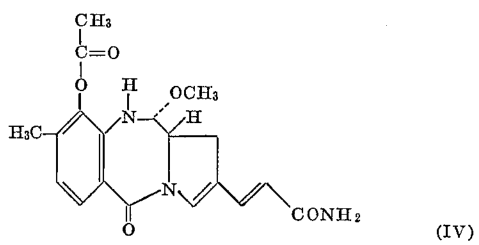

is particularly efficacious since it shows a favorable activity/toxicity ratio in the in vivo mouse antitumor tests and when tested in dogs, the tolerated dose injected intravenously is higher than in the known pyrrola benzodiazepine acrylamides, e.g., the one of Formula III.

The compound of Formula IV is substantially devoid of pronounced irritant and necrotizing effects at the site of the injection such as those observed with compound III. For example, when mice were given 0.5 to 1 mg./kg. by the s.c. route at the nape of the neck with the compound of Formula IV, little or not redness of thickening of the skin occurs.

In the preparation of the compound of Formula IV, it is preferred to crystallize it from an N,N-dimethylacetamide (DMAC) solution, using ether. In that event, the crystals are obtained as a DMAC-solvate having a 1:1 molar composition.

The compounds of Formula I and II can be prepared by various and alternative methods, depending on the desired products, utilizing as the starting material the compound of Formula III or its hydrate.

For example, when $R_1$ of compound I or II is acyl, e.g., benzoyl or alkanoyl containing from 1 to 6 carbon atoms inclusive, the appropriate anhydride in the presence of a tertiary amine is reacted with the compound of Formula III according to the following reaction scheme A:

Scheme A

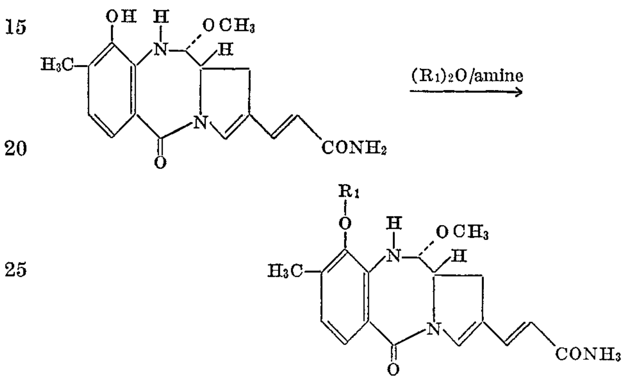

Generally, this reaction is carried out at room temperature when the acyl group is alkanoyl, i.e., about 20° to 25° C., for a sufficient length of time to complete the reaction. The time required is generally from about two hours for the more reactive alkanoic anhydrides, e.g., acetic anhydride, to about 24 hours or more for the less reactive anhydrides, e.g., butyric, valeric and caproic anhydrides. The temperature of this reaction is critical only insofar as it is not so high that it results in undesired products, e.g., diacyl derivatives, thus temperatures up to about 28° C. are satisfactory.

When the acyl substituent in the depicted reaction scheme A is benzoyl, the reaction conditions are somewhat more severe than when an alkanoic anhydride is the reactant, i.e., the reaction temperatures preferably should be about 75° to 85° C. and the reaction time should preferably be about 2 to 3 hours.

In the reaction depicted, the acid anhydride is dissolved in a tertiary amine, generally a lower alkyl tertiary amine on a volume basis of from 1:1 to 1:2, preferably about 1:1 in the case of the alkanoic anhydrides and in the case of the benzoic anhydride, a weight to volume ratio of anhydride to amine of about 1:10. Suitable amines are trimethyl amine, triethyl amine, tripropylamine and the like, preferred is triethylamine.

The acylated products are crystalline and are removed from the reaction medium by means of filtration and are purified by recrystallization.

The epimers at the 11-carbon of the acyl derivatives of the compounds of Formula I and depicted in the above reaction can be prepared by alternative methods as depicted in the following reaction scheme B, using the compound of Formula III as the starting material:

Scheme B

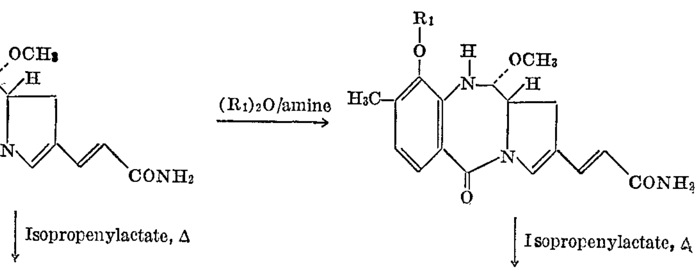

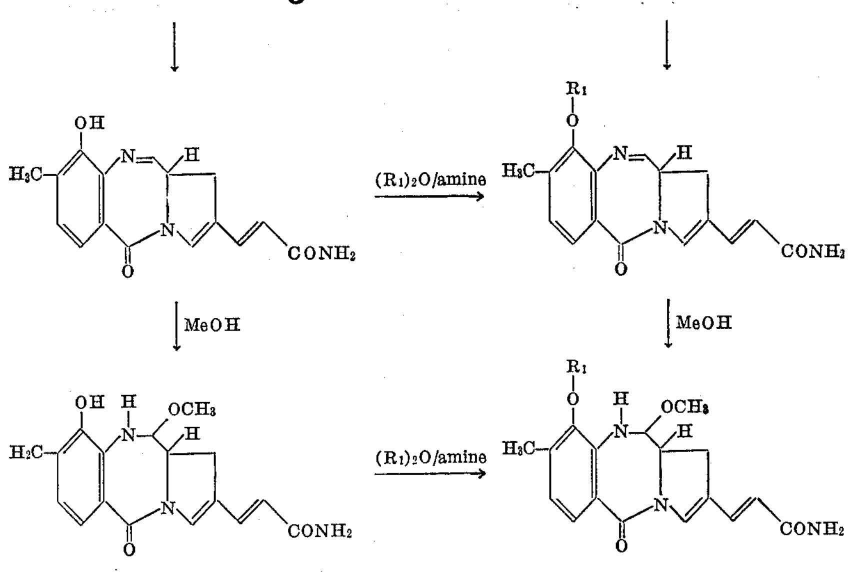

In one alternative synthesis route, the epimer is prepared by first acylating the compound of Formula III as previously described and then removing methanol from the molecule with isopropenyl acetate. The removal of methanol is conducted at reflux for about 8 hours. The resulting product is a crystalline compound which is recovered by filtration. The acyl substituted derivative is then treated with methanol at room temperature. The resulting product is the epimer of the acylated compounds previously described.

Alternatively, methanol can be first removed from the compound of Formula III, the resulting product then acylated and re-etherified using the reaction conditions and reagents described previously for the same reactions.

In the third alternative, after removal of methanol from the compound of Formula III, the product is re-etherified and finally acylated, using the reaction conditions described.

The preferred alternate synthesis is the first one described since two useful intermediates are also produced, i.e., the acylated compound, and the acylated imino compound.

Compounds of Formula I wherein $R_1$ is a carbamoyl group are prepared generally by reacting the compound of Formula III, preferably in its hydrate form, with the appropriate isocyanate, e.g., phenylisocyanate, or alkylisocyanate, in acetone and a tertiary amine as depicted in the following equation:

Scheme C

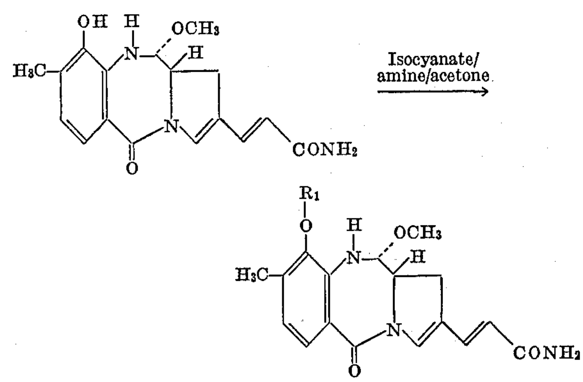

This reaction is generally carried out at about room temperature, e.g., about 20° C. to 25° C. until the reaction is complete, usually within about 1–3 hours. The products are crystalline and are recovered by filtration and recrystallized from acetone. The isocyanate and the tertiary amine, preferably triethylamine, are mixed in a 2 to 1 ratio by volume in a volume of acetone about 100 times that of the isocyanate and containing in suspension the compound of Formula III.

The compounds of Formula I wherein $R_1$ is alkoxycarbonyl are prepared generally by reacting the compound of Formula III, preferably in hydrated form, with the dialkyl ester of pyrocarbonic acid corresponding to the desired alkoxycarbonyl group, in the presence of a tertiary amine according to reaction scheme D as depicted:

Scheme D

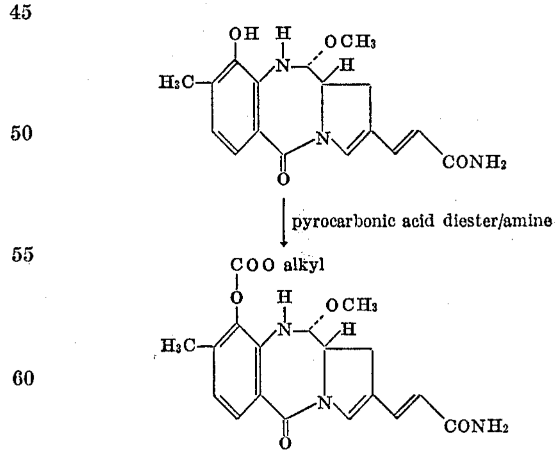

In this reaction about 1 part by volume of the pyrocarbonic acid diester is dissolved in about 8–10 parts by volume of a tertiary amine, preferably triethylamine, and reacted with the compound of Formula III, preferably in its hydrated form, for about 24 hours at room temperature, e.g., 20°–25° C. The crystalline product is recovered and recrystallized from ether. The tertiary amine solvent utilized in this reaction can be the same as that in the acylation reactions previously discussed.

The compound of Formula I wherein $R_1$ and $R_2$ are acyl and $R_3$ is acyloxy is prepared by alternative methods as can be deduced from the following reaction scheme E:

Scheme E

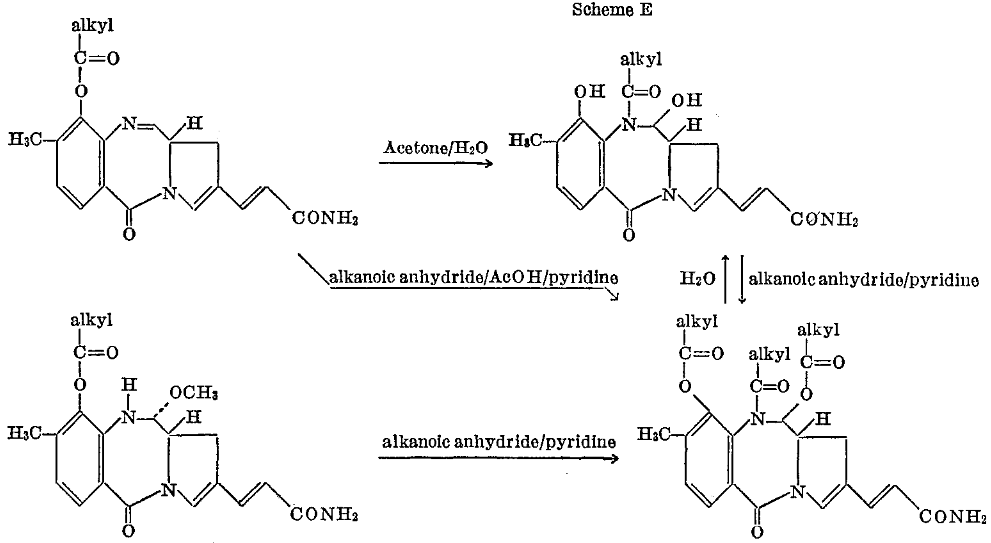

For example, one alternative process by which this product is produced is wherein the compound resulting from reaction sequence A is reacted with the appropriate alkanoic acid anhydride in a pyridine solvent at room temperature, e.g., 20° C. to 25° C. for 24 hours.

Another alternative is to react the imino derivative of compound IV dissolved in pyridine and a combination of 1 part by volume of the appropriate alkanoic acid and 15 parts by volume of the acid anhydride of the same acid, at room temperature, e.g., 20° C. to 25° C. until the reaction is complete, usually two to three days.

Still another alternative is to react the imino derivative of compound IV with water dissolved in acetone to shift the acyl group to the nitrogen and then react this product (which is a crystalline material and can be isolated by filtration and recrystallization), dissolved in pyridine, with the desired acid anhydride at room temperature, e.g., 20° to 25° C. for about 2 to 3 days. The product is then isolated and recrystallized from acetone.

The triacyl compound thus produced can be hydrolyzed to form the N-acyl derivative from which it is made in the latter alternative synthesis. This latter synthesis is preferred because it results in two useful compounds within the scope of Formula I.

If it is desired to produce a diacyl derivative, it is necessary to react the appropriate acid anhydride in the presence of a tertiary amine, with the compound of Formula III or preferably its hydrate form, at elevated temperatures according to the following reaction scheme F:

Scheme F

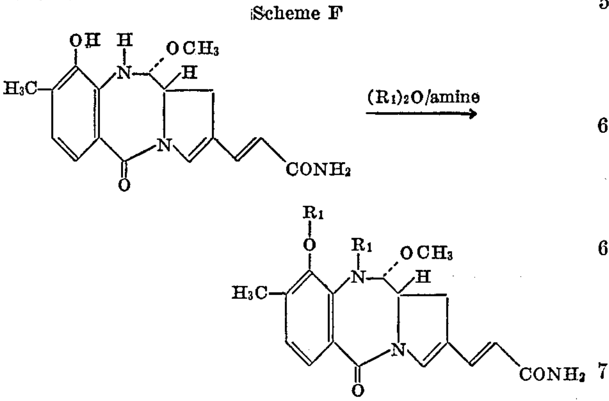

Preferably the reaction conditions are somewhat more severe than required for the mono-acyl derivative as depicted in reaction scheme A, i.e., the temperature must be elevated, e.g., from 40° C. to 65° C. for extended times, e.g., about 20 to 30 hours, depending on the reactivity of the acyl reagent. The crystalline products are recovered and recrystallized from an ether-acetone mixture. The tertiary amine serves the identical function as in reaction scheme A and can be selected from the same group. The ratio of amine and acid anhydride is the same as in scheme A.

The compounds of this invention are prepared in accordance with the following examples in which (a) melting points were determined on a Thomas-Hoover melting point apparatus and are uncorrected, (b) UV-spectra were measured with a Cary-Recording Spectrophotometer Model 14M and (c) IR-spectra were measured with a Beckman Infrared Spectrophotometer Model IR9. Temperatures are in ° C.

EXAMPLE 1

Acetate of (11R:11aS) - 5,10,11,11a - tetrahydro-9-hydroxy-11 - methoxy - 8 - methyl-5-oxo-1H-pyrrolo [2,1-c] [1,4]benzodiazepine-2-trans-acrylamide (a) A suspension of 1 g. of the hydrate of the compound of Formula III in 50 ml. of acetic anhydride-triethylamine (1:1) [1] was stirred at room temperature for 4 hrs. Filtration afforded a white material which was crystallized from acetone-ether to give a product with a M.P. 184–186°, dec. in vacuo. When this material was dried at 85° for 24 hrs. under high vacuum, the product, M.P. 184–186°, dec. in vacuo, was obtained free of solvent. This compound is active against Sarcoma 180 and Ehrlich solid tumors in mice. Analysis of the product showed it to have the following characteristics.

UV:

$\lambda_{max.}^{MeOH}$ m$\mu$ ($\epsilon$): 215 (23,000), 233 (26,500), 332 (35,000), 350s (30,000)

IR:

$\nu_{max.}^{KBr.}$ (cm.$^{-1}$): 3475, 3335, 1765, 1670, 1610, 1525, 1480

$[\alpha]_D^{25}$+860.7° (C 1.00, DMSO)

(b) A suspension of 25 g. of the hydrate of (11R:11aS)-5,10,11,11a - tetrahydro - 9 - hydroxy-11-methoxy - 8 - methyl - 5 - oxo-1H-pyrrolo [2,1-c][1,4] benzodiazepine-2-trans-acrylamide in 300 ml. of acetic anhydride triethylamine (1:1) [both solvents were freshly distilled] was stirred at room temperature for 3 hours. Filtration afforded a crude reaction product which was crystallized as follows: The crude reaction product was dissolved in 400 ml. of N,N-dimethylacetamide (spectroquality) at room temperature. Then 1200 ml. of ether was added to the stirred, pale yellow solution causing

[1] Both solvents were freshly distilled.

crystallization thereof. After 1 hour the crystals were collected by filtration and dried overnight at room temperature under high vacuum. The product (11R:11aS)-5,10,11,11a - tetrahydro - 9 - hydroxy-11-methoxy-8-methyl-5-oxo - 1H - pyrrolo[2,1-c][1,4]benzodiazepine-2-transacrylamide with N,N - dimethylacetamide (1:1) obtained decomposes when heated above 130°. The crystals contain 1 mole of N,N-dimethylacetamide as evidenced by vapor phase chromatography (vpc.) and microanalysis. Analysis af the product showed it to have the following characteristics:

UV:

$\lambda_{max.}^{MeOH}$ m$\mu$ ($\epsilon$): 230 (25,600), 332 (34,200), 355s (27,800),

IR:

$\nu_{max.}^{KBr}$ (cm.$^{-1}$): 3390, 3330, 3310, 3215, 1760, 1683, 1615 (broad), 1540 vpc. The crystalline compound contains the theoretical amount, 19.1% w./w., of N,N-dimethylacetamide.

EXAMPLE 2

Acetate of (11S:11aS)-5,10,11,11a-tetrahydro-9-hydroxy-11 - methoxy - 8-methyl-5-oxo-1H-pyrrolo[2,1-c][1,4] benzodiazepine-2-trans-acrylamide

*Method A.*—The acetylation of 200 mg. of the epi isomer of the compound of Formula III was carried out in the same manner as the acetylation of the compound of Formula III as described in Example I. Filtration of the reaction mixture afforded 170 mg. of crude material which was crystallized from acetone-ether to yield a product with a M.P. 290°, dec. in vacuo. This compound is active against S 180 and Ehrlich solid tumors in mice. Analysis of the product showed it to have the following characteristics.

UV:

$\lambda_{max.}^{CH_3CN}$ m$\mu$($\epsilon$): 225(22,200), 328(34,700)

IR:

$\nu_{max.}^{KBr}$ (cm.$^{-1}$): 3375, 3225, 1775, 1700, 1685, 1640, 1520

$[\alpha]_D^{25}$ +269.0° (C 1.00, DMSO)

*Method B.*—A solution of 300 mg. of the product of Example 3 in 80 ml. of methanol was allowed to stand overnight at room temperature. After evaporation of the solvent in vacuo at room temperature, the residue was crystallized from acetone. The resulting product was identical (M.P. IR, UV) with the product obtained by Method A.

EXAMPLE 3

Acetate of (11aS)-5,11a-dihydro-9-hydroxy-8-methyl-5-oxo - 1H - pyrrolo[2,1-c][1,4]benzodiazepine-2-trans-acrylamide

*Method A.*—520 mg. of (11aS)-5,11a-dihydro-9-hydroxy-8-methyl - 5 - oxo-1H-pyrrolo[2,1-c][1,4]benzodiazepine-2-trans-acrylamide were added to 50 ml. of acetic anhydride-pyridine (1:1), and the resulting suspension was stirred for 2 hrs. at room temperature. The solid material, removed by filtration was dissolved in 900 ml. of acetone, and the resulting solution concentrated until spontaneous crystallization occurred. The recovered product had a M.P. above 300°, dec. in vacuo. This compound is active against S 180 and Ehrlich solid tumors in mice. Analysis of the product showed it to have the following characteristics.

UV:

$\lambda_{max.}^{CH_3CN}$ m$\mu$ ($\epsilon$): 230(19,200), 290s(17,500), 300s(19,600), 325s(22,900), 344(25,000)

IR:

$\nu_{max.}^{KBr}$ (cm.$^{-1}$): 3380, 3200, 1765, 1680, 1660, 1625, 1560, 1485

*Method B.*—A mixture of 5 g. of the hydrated compound of Formula III in 130 ml. of acetic anhydride-triethylamine (1:1) was stirred for 2 hrs. at room temperature. After filtration of the mixture, the solid material was added to 300 ml. of freshly distilled isopropenyl-acetate and the resulting suspension stirred under reflux for 8 hrs. The reaction mixture was left overnight at room temperature, and filtered. The resulting product was identical (IR, UV) with that obtained by Method A.

EXAMPLE 4

(11S:11aS) - 10 - acetyl - 5,10,11,11a-tetrahydro-9,11-dihydroxy-8-methyl - 5 - oxo-1H-pyrrolo[2,1-c][1,4] benzodiazepine-2-trans-acrylamide 1 gram of the product of Example 3 was added to 100 ml. of water and 25 ml. of acetone. The material dissolved on stirring, and the clear solution was kept at room temperature for 18 hrs. After removal of the acetone under reduced pressure at room temperature, the remaining aqueous solution was lyophilized and the residue was crystallized twice from methanol ether to give a compound with M.P. 240°, dec. in vacuo. This compound is active against Ehrlich solid tumors in mice. Analysis of the product showed it to have the following characteristics.

UV:

$\lambda_{max.}^{CH_3CN}$ m$\mu$ ($\epsilon$): 327 (34,000)

IR:

$\mu_{max.}^{KBr}$ (cm.$^{-1}$): 3430, 3330, 1690, 1660, 1635, 1595, 1570

$[\alpha]_D^{25}$ +354° (C 1.04, DMSO)

EXAMPLE 5

Diacetate of (11S:11aS)-10-acetyl-5,10,11,11a-tetrahydro-9,11 - dihydroxy-8-methyl-5-oxo-1H - pyrrolo[2,1-c] [1,4]benzodiazepine-2-trans-acrylamide

*Method A.*—A solution of 675 mg. of the product of Example 3 in 60 ml. of warm pyridine was allowed to cool to room temperature. Then 3 ml. of acetic acid, followed by 45 ml. of acetic anhydride, were added. The solution was left at room temperature for 3 days. The solvent was removed in vacuo at room temperature, and the sirupy residue was dissolved in 70 ml. of methylene chloride. The solution was washed with three-50 ml. portions of water, dried over sodium sulfate, and the solvent evaporated under reduced pressure to give a solid product. The material was purified by dissolving the product in acetone, treating it with charcoal and crystallizing it from acetone-ether. The resulting compound was recrystallized from acetone-benzene to give a product of M.P. 249–249.5°[2] dec. in vacuo. This compound can be hydrolyzed to form the compound of Example 4. At high dosages this compound exhibits activity against Ehrlich solid tumors in mice. Analysis of the product showed it to have the following characteristics.

UV:

$\lambda_{max.}^{CCH_3N}$ m$\mu$ ($\epsilon$): 225 (22,500), 275s (11,500), 327 (31,200)

IR:

$\nu_{max.}^{CHCl_3}$ (cm.$^{-1}$): 3530, 3410, 3020, 1775, 1680, 1660, 1755, 1625, 1610, 1585

$[\alpha]_D^{25}$+237.3° (C 1.00, DMSO)

*Method B.*—10 ml. of acetic anhydride were added to a solution of 400 mg. of the product of Example 4 in 20 ml. of pyridine. The resulting solution was kept at room temperature for 3 days, after which time the solvents were removed under reduced pressure at room temperature. A methylene chloride solution of the residue was washed three times with water, dried over sodium sulfate, and evaporated to dryness. The residue was recrystallized from acetone to give a crystalline product which was identical (IR, NMR) with the product obtained by Method A.

EXAMPLE 6

(11R:11aS) - 5,10,11,11a - tetrahydro - 9 - hydroxy - 11-methoxy - 8 - methyl - 5 - oxo - 1H - pyrrolo[2,1-c][1,4]benzodiazepine-2-trans-acrylamide propionate 5 grams of the hydrate of the compound of Formula III were added to a solution of 150 ml. of freshly distilled propionic anhydride in 150 ml. of triethylamine. The suspension was stirred at room temperature for 24 hrs. and then filtered. The resulting white solid material was washed thoroughly with ether, and crystallized from acetone-ether to give a product of M.P. 150–154/238–240°,[3]

UV:

$\lambda_{max.}^{CH_3CN}$ mμ (ε): 230 (24,200), 330 (31,500), 350a (27,600)

IR:

$\nu_{max.}^{KBr}$ (cm.$^{-1}$): 3480, 3335, 3210, 1765, 1670, 1635, 1610, 1530 in vacuo. This compound is active against S 180 and Ehrlich solid tumors in mice. A sample dried at 100° for 4 hrs. was analyzed and the product had the following characteristics.

EXAMPLE 7

(11R:11aS) - 5,10,11,11a - tetrahydro - 9 - hydroxy - 11-methoxy - 8 - methyl - 5 - oxo - 10 - propionyl - 1H-pyrrolo[2,1-c][1,4]benzodiazepine - 2 - trans-acrylamide propionate A mixture of 5 g. of the hydrate of the compound of Formula III in 125 ml. of propionic anhydride-triethylamine (1:1)[4] was stirred at 50–60° for 28 hrs. The warm mixture was filtered, the solids were washed with warm triethylamine, then with ether, and dried at room temperature under vacuum in a desiccator. The crude material thus obtained was crystallized twice from acetone-toluene. The resulting product had a M.P. 249–250°, dec. in vacuo. This compound is active against S 180 and Ehrlich solid tumors in mice. It was analyzed and had the following characteristics.

UV:

$\lambda_{max.}^{CH_3CN}$ mμ (ε): 228s, (16,900), 333 (29,500)

IR:

$\nu_{max.}^{KBr}$ (cm.$^{-1}$): 3340, 3210, 1770, 1690, 1660, 1625, 1610

EXAMPLE 8

(11R:11aS) - 5,10,11,11a - tetrahydro - 9 - hydroxy - 11-methoxy - 8 - methyl - 5 - oxo - 1H - pyrrolo[2,1-c][1,4]benzodiazepine-2-trans-acrylamide butyrate 5 grams of the hydrate of the compound of Formula III were added to a solution or 100 ml. of freshly distilled butyric anhydride in 125 ml. of triethylamine. The resulting suspension was stirred for 24 hrs. at room temperature. The solids were filtered, washed with ether, dried at room temperature under high vacuum, and recrystallized twice from acetone-ether to give a product of M.P. 240°, dec. in vacuo. This product is active against S 180 and Ehrlich solid tumors in mice. A sample dried for 3 hrs. at 55° under vacuum was analyzed and had the following characteristics.

UV:

$\lambda_{max.}^{CH_3CN}$ mμ (ε): 231 (26,100), 329 (33,700), 350s, (30,000)

IR:

$\nu_{max.}^{KBr}$ (cm.$^{-1}$): 3395, 3225, 1765, 1690, 1660, 1620, 1595, 1530

EXAMPLE 9

(11R:11aS) - 5,10,11,11a - tetrahydro - 9 - hydroxy - 11-methoxy - 8 - methyl - 5 - oxo - 1H - pyrrolo[2,1-c][1,4]benzodiazepine-2-trans-acrylamide benzoate A solution of 50 g. of benzoic anhydride in 500 ml. of triethylamine was heated to 80°, and 10 g. of the hydrate of the compound of Formula III were added rapidly. The reaction mixture was stirred at 80° for 2½ hours, and then filtered while still warm. The resulting solid material was washed with warm triethylamine, then with ether and dried at room temperature under high vacuum. It was then crystallized from 1.5 liters of acetone. Recrystallization from 4.5 liters of methylene chloride resulted in a product of M.P. 240°, dec. in vacuo. This compound is active against S 180 and Ehrlich solid tumors in mice. Analysis of the product showed it to have the following characteristics.

UV:

$\lambda_{max.}^{CH_3CN}$ mμ (ε): 231 (40,500), 330 (31,300), 350s (28,100)

IR:

$\nu_{max.}^{KBr}$ (cm.$^{-1}$): 3465, 3380, 3210, 1740, 1680, 1665, 1610, 1590, 1520

EXAMPLE 10

(11R:11aS) - 5,10,11,11a - tetrahydro - 9 - hydroxy - 11-methoxy - 8 - methyl - 5 - oxo - 1H - pyrrolo[2,1-c][1,4]benzodiazepine-2-trans-acrylamide carbanilate 4 ml. of phenylisocyanate and 2 ml. of triethylamine were added to a suspension of 4 grams of the hydrate of the compound of Formula III in 400 ml. of acetone. The reaction mixture was stirred until a clear solution was obtained and then allowed to stand at room temperature for 1½ hrs. during which time crystallization occurred. After the addition of 400 ml. of ether, the solid reaction product was collected by filtration, washed with ether, and then dried at room temperature under high vacuum. The crude material thus obtained was crystallized twice from 500 ml. of acetone to result in a product of M.P. 172–173°, dec. in vacuo. This compound is active against S 180 and Ehrlich solid tumors in mice. A sample dried overnight at 100° under high vacuum was analyzed and found to have the following characteristics.

UV:

$\lambda_{max.}^{CH_3CN}$ mμ (ε): 232 (41,700), 330 (31,700), 350s (28,500)

IR:

$\nu_{max.}^{KBr}$ (*cm.*$^{-1}$): 3340, 1755, 1665, 1625, 1605, 1545

EXAMPLE 11

(11R:11aS)-5,10,11,11a - tetrahydro - 9 - hydroxy - 11-methoxy - 8 - methyl - 5 - oxo-1H-pyrrolo[2,1-c][1,4]benzodiazepine-2-trans-acrylamide N-ethylcarbamate 6 ml. of ethylisocyanate and 3 ml. of triethylamine were added to a suspension of 6 grams of the hydrate of the compound of Formula III in 600 ml. of acetone. The reaction mixture was stirred at room temperature for 2 hrs., after which time 600 ml. of ether were added. Filtration afforded 6.8 g. of crude material, which was crystallized from 3 liters of acetone to yield a product of m.p. 192.5–194°, dec. in vacuo. This compound is active against S 180 in mice. A sample dried at 100° in

---

[3] Two M.P. were observed for this compound.
[4] Both solvents were freshly distilled.

high vacuum for 3 hrs. was analyzed and found to have the following characteristics.

UV:

$\lambda_{max.}^{CH_3CN}$ mμ (ε): 231 (25,700), 277s (5,800), 330 (34,100) 350s (29,800)

IR:

$\nu_{max.}^{KBr}$ (*cm.*$^{-1}$): 3350, 3225, 2985, 2940, 1755, 1685, 1660, 1620, 1580, 1535

EXAMPLE 12

(11R:11aS)-5,10,11,11a - tetrahydro - 9 - hydroxy - 11-methoxy - 8 - methyl - 5 - oxo-1H-pyrrolo[2,1-c] [1,4] benzodiazepine-2-trans-acrylamide ethyl carbonate 10 grams of the hydrate of the compound of Formula III were added to a solution of 30 ml. of pyrocarbonic acid diethyl ester [prepared according to Degering et al., J. Am. Pharm, Assoc. 39, 624 (1950)] in 250 ml. of triethylamine. The suspension was stirred at room temperature for 24 hrs. and then filtered. The resulting white material was washed thoroughly with ether and then dissolved with stirring in 2 liters of acetone at room temperature. After the addition of 4 liters of ether to the stirred clear solution, crystallization occurred. The mixture was placed in the refrigerator overnight. The crystals were then collected by filtration and dried under high vacuum at room temperature overnight. The product had a M.P. 191–192°, dec. in vacuo. This compound is active against S 180 and Ehrlich solid tumors in mice. A sample was analyzed and found to have the following characteristics:

UV:

$\lambda_{max.}^{CH_3CN}$ mμ (ε): 230 (25,000), 329 (32,100), 347s (30,000)

IR:

$\nu_{max.}^{KBr}$ (*cm*$^{-1}$): 3410, 3220, 2940, 1760, 1685, 1660, 1620, 1590, 1530

The following are typical pharmaceutical forms in which the compounds of Formula I can be utilized.

EXAMPLE 13

Tablet formulation

| | Per tablet, mg. |
|---|---|
| Acetate of (11R:11aS) - 5,10,11,11a-tetrahydro-9-hydroxy-11-methoxy-8-methyl-5-oxo-1H-pyrrolo [2,1-c][1,4]benzodiazepine-2-trans-acrylamide | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) Acetate of (11R:11aS)-5,10,11,11a-tetrahydro-9-hydroxy - 11 - methoxy - 8 - methyl-5-oxo-1H-pyrrolo [2,1-c] [1,4]benzodiazepine-2-trans - acrylamide, lactose, corn starch and pregelatinized corn starch were mixed in a suitable mixer.

(2) The mix was passed through a Fitzpatrick Comminuting Machine fitted with No. 1A screen and with knives forward.

(3) The mixture was returned to the mixed and moistened with water to a thick paste. The moist mass was passed through a No. 12 screen, and the moist granules were dried on paper lined trays at 110° F.

(4) The dried granules were returned to the mixer, and the calcium stearate was added and mixed well.

(5) The granules were compressed at a tablet weight of 200 mg. using standard concave punches having a diameter of 5/16″.

Each of the compounds produced according to Examples 2–12 inclusive can be substituted in this formulation, in equal weight amounts, for the exemplified compound.

EXAMPLE 14

Tablet formulation

| | Per tablet, mg. |
|---|---|
| Acetate of (11R:11aS) - 5,10,11,11a-tetrahydro-9-hydroxy-11-methoxy-8-methyl-5-oxo-1H- pyrrolo [2,1-c][1,4]benzodiazepin-2-trans-acrylamide | 25.00 |
| Lactose, U.S.P. | 64.50 |
| Corn starch | 10.00 |
| Magnesium stearate | 0.50 |

Procedure (1) Acetate of (11R:11aS)-5,10,11,11a-tetrahydro-9-hydroxy- 11 - methoxy-8-methyl-5-oxo-1H-pyrrolo[2,1-c] [1,4]benzodiazepine-2-trans-acrylamide was mixed with the lactose, corn starch and magnesium stearate in a suitable mixer.

(2) The mixture further blended by passing through a Fitzpatrick Comminuting Machine fitted with a No. 1A screen with knives forward.

(3) The mixed powders were slugged on a tablet compressing machine.

(4) The slugs were comminuted to a suitable mesh size (No. 16 screen) and mixed well.

(5) The tablets were compressed at a tablet weight of 100 mg. using tablet punches having a diameter of approximately 1/4″. (Tables may be either flat or biconvex and may be scored if desired.)

Each of the compounds produced according to Examples 2–12 inclusive can be substituted in this formulation, in equal weight amounts, for the exemplified compound.

EXAMPLE 15

Table formulation

| | Per table, mg. |
|---|---|
| Acetate of (11R:11aS)-5,10,11,11a-tetrahydro-9-hydroxy-11-methoxy-8-methyl-5-oxo-1H-pyrrolo [2,1-c][1,4]benzodiazepine-2-trans-acrylamide | 100 |
| dicalcium phosphate | 60 |
| Corn starch | 157 |
| Magnesium stearate | 3 |
| Total weight | 320 |

Procedure (1) Acetate of (11R:11aS)-5,10,11,11a-tetrahydro-9-hydroxy-11-methoxy-8-methyl-5-oxo - 1H-pyrrolo[2,1-c] [1,4]benzodiazepine-2-trans-acrylamide was mixed with the dicalcium phosphate, corn starch and magnesium stearate in a suitable mixer.

(2) The mixture was further blended by passing through a Fitzpatrick Comminuting Machine fitted with a No. 1A screen with knives forward.

(3) The mixed powders were slugged on a tablet compressing machine.

(4) The slugs were comminuted to a suitable mesh size (No. 16 screen) and mixed well.

(5) The tablets were compressed at a tablet weight of 320 mg. using tablet punches having a diameter of 3/8″ (flat beveled faced punches).

Each of the compounds produced according to Examples 2–12 inclusive can be substituted in this formulation, in equal weight amounts, for the exemplified compound.

EXAMPLE 16

Capsule formulation

| | Per capsule, mg. |
|---|---|
| Acetate of (11R:11aS)-5,10,11,11a-tetrahydro-9-hydroxy - 11 - methoxy-8-methyl-5-oxo-1H-pyrrolo [2,1-c][1,4]benzodiazepine-2-trans-acrylamide | 50 |
| Lactose, U.S.P. | 125 |
| Corn starch, U.S.P. | 30 |
| Talc, U.S.P. | 5 |
| Total weight | 210 |

Procedure (1) Acetate of (11R:11aS)-5,10,11,11a-tetrahydro-9-hydroxy-11-methoxy-8-methyl-5--oxo - 1H-pyrrolo[2,1-c][1,4]benzodiazepine-2-trans-acrylamide was mixed with lactose and corn starch in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine.

Each of the compounds produced according to Examples 2–12 inclusive can be substituted in this formulation, in equal weight amounts, for the exemplified compound.

EXAMPLE 17

Capsule formulation

| | Per capsule, mg. |
|---|---|
| Acetate of (11R:11aS) - 5,10,11,11a-tetrahydro-9-hydroxy-11-methoxy-8-methyl-5-oxo-1H-pyrrolo [2,1-c][1,4]benzodiazepine-2-trans-acrylamide | 25.5 |
| Lactose | 159.5 |
| Corn starch | 30.0 |
| Talc | 5.0 |
| Total net weight | 220.0 |

Procedure (1) Acetate of (11R:11aS)-5,10,11,11a-tetrahydro-9-hydroxy-11-methoxy-8-methyl-5-oxo - 1H-pyrrolo[2,1-c][1,4]benzodiazepine-2-trans-acrylamide, lactose and corn starch were mixed in a suitable mixer.

(2) The mixture was passed through a Fitzpatrick Comminuting Machine using a No. 1A screen and knives forward.

(3) The mixture was returned to the mixer and the talc added. It was blended well and filled into No. 4 two piece, hard gelatin capsules on a Parke Davis capsulating machine. (Any similar type capsulating machine may be used.)

Each of the compounds produced according to Example 2–12 inclusive can be substituted in this formulation, in equal weight amounts, for the exemplified compound.

EXAMPLE 18

Capsule formulation

| | Per capsule, mg. |
|---|---|
| Acetate of (11R:11aS)-5,10,11,11a-tetrahydro-9-hydroxy - 11 - methoxy-8-methyl-5-oxo-1H-pyrrolo [2,1-c][1,4]benzodiazepine - 2-trans-acrylamide | 100 |
| Corn starch | 200 |
| Talc | 10 |
| Total weight | 310 |

Procedure (1) Acetate of (11R:11aS) - 5,10,11,11a-tetrahydro-9-hydroxy - 11 - methoxy - 8-methyl-5-oxo-1H-pyrrolo-[2,1-c][1,4]benzodiazepine-2-trans-acrylamide was mixed with the corn starch in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 1 hard shell gelatin capsules on a Parke Davis capsulating machine.

Each of the compounds produced according to Examples 2–12 inclusive can be substituted in this formulation, in equal weight amounts, for the exemplified compound.

EXAMPLE 19

Suppository formulation

| | Per 1.3 gm. suppository, gm. |
|---|---|
| Acetate of (11R:11aS) - 5,10,11,11a - tetrahydro-9 - hydroxy - 11 - methoxy-8-methyl-5-oxo-1H-pyrrolo[2,1-c][1,4]benzodiazepine - 2 - trans-acrylamide | 0.100 |
| Wecobee M [5] | 1.155 |
| Carnauba wax | 0.045 |

[5] E. F. Drew Company, 522 Fifth Ave., New York, N.Y.

Procedure (1) The Wecobee and the carnauba wax were melted in a suitable size glass lined container, mixed well and cooled to 45° C.

(2) Acetate of (11R:11aS)-5,10,11,11a - tetrahydro-9-hydroxy - 11 - methoxy - 8 - methyl-5-oxo-1H-pyrrolo-[2,1-c][1,4]benzodiazepine-2 - trans-acrylamide, which had been reduced to a fine powder with no lumps, was added and stirred until completely and uniformly dispersed.

(3) The mixture was poured into suppository molds to yield suppositories having an individual weight of 1.3 gms.

(4) The suppositories were removed from molds and cooled. They were individually wrapped in wax paper for packaging.

Each of the compounds produced according to Examples 2–12 inclusive can be substituted in this formulation, in equal weight amounts, for the exemplified compound.

EXAMPLE 20

Parenteral formulation (11R:11aS)-5,10,11,11a - tetrahydro - 9 - hydroxy-11-methoxy - 8 - methyl - 5 - oxo-1H-pyrrolo[2,1-c][1,4]benzodiazepine-2-trans-acrylamide propionate was prepared by dissolving in anhydrous ethanol, filling a measured amount of the solution into a multiple dose vial and then evaporating ethanol and sealing the vial. It is accompanied by an ampul containing a special solution for solubilizing the drug prior to injection. Amounts and procedure are as follows:

| | 5 ml. multiple dose vial, mg. |
|---|---|
| (11R:11aS) - 5,10,11,11a - tetrahydro-9-hydroxy-11-methoxy - 8 - methyl-5-oxo-1H-pyrrolo[2,1-c][1,4]benzodiazepine-2-trans-acrylamide propionate | 4 |

Procedure (11R:11aS) - 5,10,11,11a-tetrahydro-9-hydroxy-11-methoxyl-8-methyl - 5 - oxo-1H-pyrrolo[2,1-c][1,4]benzodiazepine-2-trans-acrylamide propionate was dissolved in anhydrous ethanol to obtain a 1 mg./ml. solution. It was then bacteriologically filtered through an 02 Selas candle and filled aseptically, 4 ml./5 ml. vial. These were stoppered loosely with rubber vial stoppers and the vials were then placed in a vacuum chamber with a cold trap at −60° C. and vacuum was applied while the vials were heated to 30° C. by circulating fluid in the shelves of the vacuum drier. This condition was maintained for approximately 18 hours with a final vacuum of about 50 microns. Before releasing the vacuum the stoppers were pressed down mechanically and the vacuum was then released and the vials were capped with aluminum seals.

| | Special diluent per 5 cc. vial, percent |
|---|---|
| Propylene glycol | 40 |
| Ethanol anhydrous | 10 |
| Benzyl alcohol | 1.5 |
| Water for Injection | 48.5 |

Procedure

The listed materials were mixed in a suitable size glass lined tank. The solution was made to volume, filtered through an 02 Selas candle filter and filled into the multiple dose vials. The vials were stoppered and sealed with aluminum seals.

For use 4 ml. of this special diluent was added to the multiple dose vial containing the drug. This was then gently shaken until all of the drug was in solution. The finished solution was then ready for injection.

Each of the compound produced according to Examples 7, 8, 10, 11 and 12 can be substituted in this formulation, in equal weight amounts, for the exemplified compound.

EXAMPLE 21

Parenteral formulation

Acetate of (11R:11aS) - 5,10,11,11a - tetrahydro-9-hydroxy-11-methoxy - 8 - methyl - 5-oxo-1H-pyrrolo[2,1-c] [1,4]benzodiazepine-2-trans-acrylamide was prepared by dissolving in anhydrous ethanol, filling a measured amount of the solution into a multiple dose vial and then evaporating ethanol and sealing the vial. It is accompanied by an ampoule containing a special solution for solubilizing the drug prior to injection. Amounts and procedure are as follows:

| | 5 ml. multiple dose vial, mg. |
|---|---|
| Acetate of (11R:11aS)-5,10,11,11a-tetrahydro-9-hydroxy - 11 - methoxy - 8 - methyl-5-oxo-1H-pyrrolo [2,1-c] [1,4]benzodiazepine-2-trans-acrylamide | 4 |

Procedure

Acetate of (11R:11aS)-5,10,11,11a - tetrahydro-9-hydroxy - 11 - methoxy - 8-methyl-5-oxo-1H-pyrrolo[2,1-c] [1,4]benzodiazepine-2-trans-acrylamide was dissolved in anhydrous ethanol to obtain a 1 mg./ml. solution. It was then bacteriologically filtered through an 02 Selas candle and filled aseptically, 4 ml./5 ml. vial. These were stoppered loosely with rubber vial stoppers and the vials were then placed in a vacuum chamber with a cold trap at −60° C. and vacuum was applied while the vials were heated to 30° C. by circulating fluid in the shelves of the vacuum drier. This condition was maintained for approximately 18 hours with a final vacuum of about 50 microns. Before releasing the vacuum the stoppers were pressed down mechanically and the vacuum was then released and the vials were capped with aluminum seals.

For use—immediately before use the lyophilized drug was solubilized with the following solution:

Water for injection, U.S.P. ---------------- 4 ml.

The water for injection was added to the multiple dose vial containing the drug. This was then gently shaken until all of the drug was in solution. The finished solution was then ready for injection.

Each of the compounds produced according to Examples 2, 3 and 9 can be substituted in this formulation, in equal weight amounts, for the exemplified compound.

EXAMPLE 22

Parenteral formulation

Diacetate of (11S:11aS)-10-acetyl-5,10,11,11a-tetrahydro - 9,11 - dihydroxy - 8 - methyl-5-oxo-1H-pyrrolo [2,1-c] [1,4]benzodiazepine-2-trans-acrylamide was prepared in duplex ampuls, one containing the dry drug and the other containing water for injection, U.S.P.

| | Dry fill ampul 5 cc., mg. |
|---|---|
| Diacetate of (11S:11aS) - 10 - acetyl - 5,10,11,11a-tetrahydro - 9,11 - dihydroxy - 8 - methyl-5-oxo-1H-pyrrolo[2,1-c] [1,4]benzodiazepine - 2 - trans-acrylamide | 5 |

A parenteral grade of diacetate of (11S:11aS)-10-acetyl - 5,10,11,11a - tetrahydro-9,11-dihydroxy-8-methyl-5-oxo - 1H - pyrrolo[2,1-c] [1,4]benzodiazepine-2 -trans-acrylamide, fiber free, was filled into the ampul using a Diehl Mater electric filler. The ampuls were sealed and sterilized at 255° F. for 2 hours.

| | Special diluent per 5 cc. vial, percent |
|---|---|
| Propylene glycol | 40 |
| Ethanol anhydrous | 10 |
| Benzyl alcohol | 1.5 |
| Water for injection | 48.5 |

Procedure

The listed materials were mixed in a suitable size glass lined tank. The solution was made to volume, filtered through an 02 Selas candle filter and filled into the multiple dose vials. The vials were stoppered and sealed with aluminum seals.

For use 4 ml. of this special diluent was added to the multiple dose vial containing the drug. This was then gently shaken until all of the drug was in solution. The finished solution was then ready for injection.

EXAMPLE 23

Parenteral formulation (11S:11aS) - 10 - acetyl - 5,10,11,11a-tetrahydro-9,11-dihydroxy - 8 - methyl - 5 - oxo-1H-pyrrolo[2,1-c] [1,4] benzodiazepine-2-trans-acrylamide was prepared in duplex ampuls, one containing the dry drug and the other containing water for injection, U.S.P.

| | Dry fill ampul 5 cc., mg. |
|---|---|
| (11S:11aS) - 10 - acetyl - 5,10,11,11a - tetrahydro-9,11-dihydroxy - 8 - methyl - 5 - oxo-1H-pyrrolo [2,1-c] [1,4]benzodiazepine-2-trans-acrylamide | 5 |

A parenteral grade of (11S:11aS)-10-acetyl-5,10,11, 11a - tetrahydro - 9,11 - dihydroxy - 8-methyl-5-oxo-1H-pyrrolo[2,1-c] [1,4]benzodiazepine - 2 - trans-acrylamide, fiber free, was filled into the ampul using a Diehl Mater electric filler. The ampuls were sealed and sterilized at 255° F. for 2 hours.

Immediately before use the powder was solubilized with the following solution:

Water for injection, U.S.P. ---------------- 5 cc.

What is claimed is:

1. A compound selected from the group consisting of:

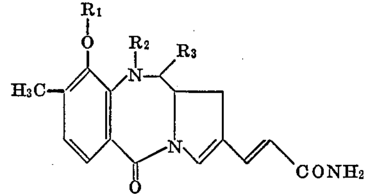

and

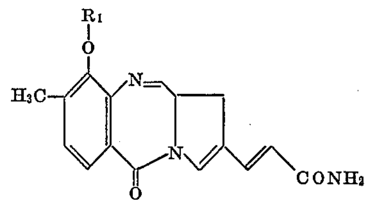

wherein $R_1$ is selected from the group consisting of hydrogen, benzoyl, alkanoyl of from 1 to 6 carbon atoms inclusive, carbamoyl substituted on the nitrogen atom with phenyl or alkyl of from 1 to 6 carbon atoms inclusive and alkoxy-carbonyl of from 1 to 6 carbon atoms inclusive in the alkoxy group; $R_2$ is selected from the group consisting of hydrogen, benzoyl and alkanoyl of from 1 to 6 carbon atoms inclusive; and at least one of $R_1$ and $R_2$ is a substituent other than hydrogen; $R_3$ is selected from the group consisting of alkoxy of from 1 to 6 carbon atoms inclusive, hydroxy and alkanoyloxy of from 1 to 6 carbon atoms inclusive.

2. A compound selected from the group consisting of:

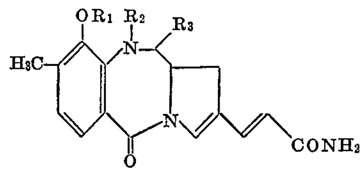

and

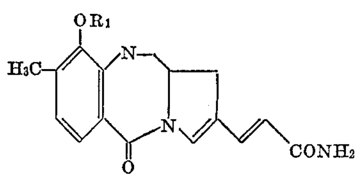

wherein $R_1$ is benzoyl or alkanoyl of from 1 to 6 carbon atoms inclusive, $R_2$ is hydrogen and $R_3$ is alkoxy of from 1 to 6 carbon atoms inclusive.

3. A compound of the formula:

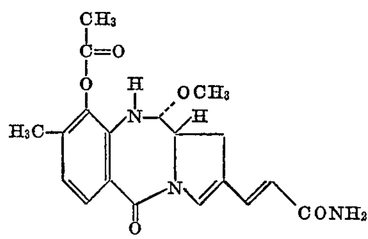

4. A compound of the formula:

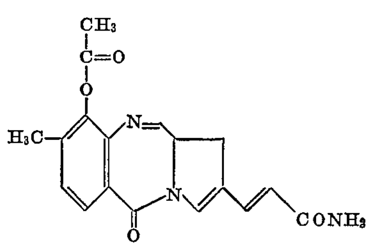

5. A compound of the formula:

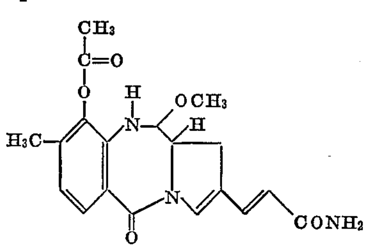

6. A compound of the formula:

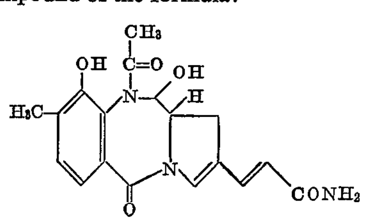

7. A compound of the formula:

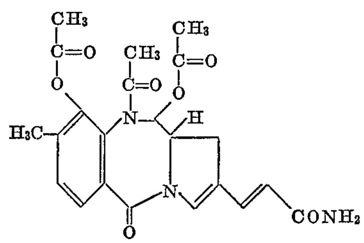

8. A compound of the formula:

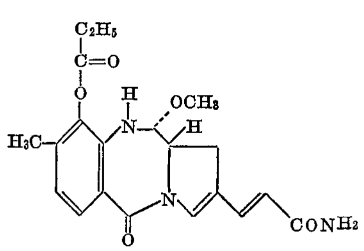

9. A compound of the formula:

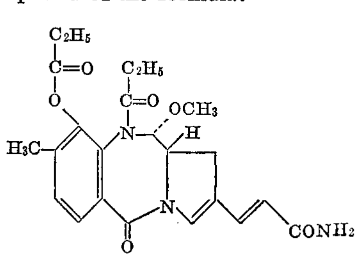

10. A compound of the formula:

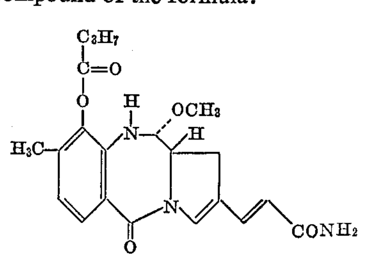

11. A compound of the formula:

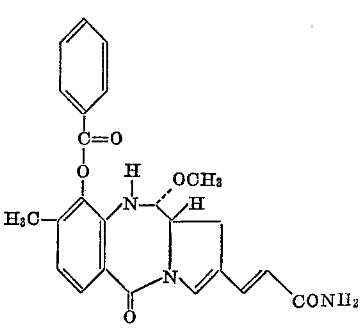

12. A compound of the formula:

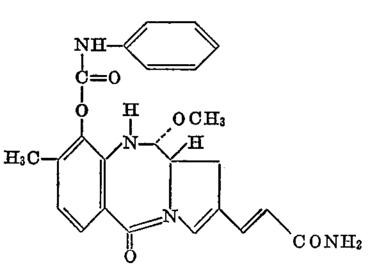

13. A compound of the formula:

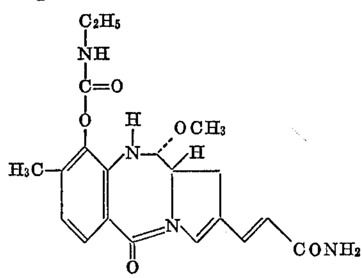

14. A compound of the formula:

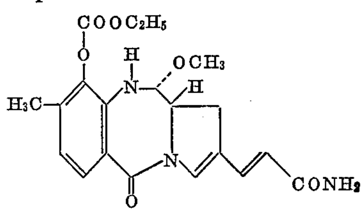

15. A compound of the formula:

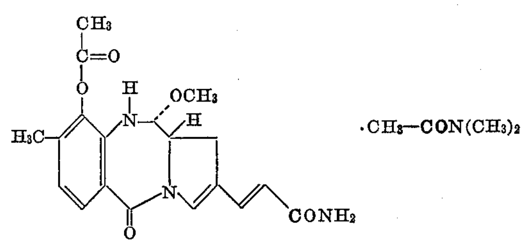

16. A process for the preparation of a compound of the formula:

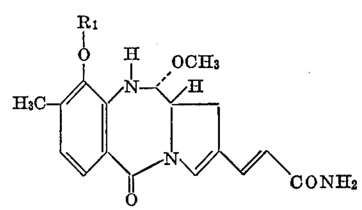

wherein $R_1$ is benzoyl or alkanoyl of from 1 to 6 carbon atoms inclusive, which comprises reacting the compound of the formula:

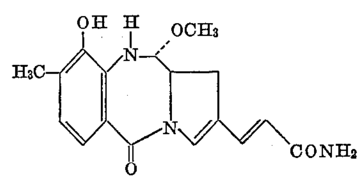

with an acid anhydride of the formula $(R_1)_2O$ dissolved in a tertiary amine on a volume basis of from 1:1 to 1:10 for from about 2 to about 24 hours to complete the reaction at temperatures of from about 20° C. to about 28° C. when $R_1$ is alkanoyl of from 1 to 6 carbon atoms inclusive and from about 75° C. to about 85° C. when $R_1$ is benzoyl.

17. A process for the preparation of a compound of the formula:

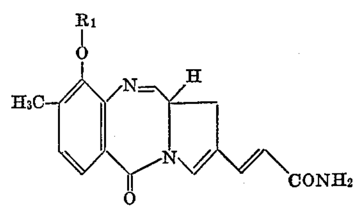

wherein $R_1$ is benzoyl or alkanoyl of from 1 to 6 carbon atoms inclusive which comprises refluxing a compound of the formula:

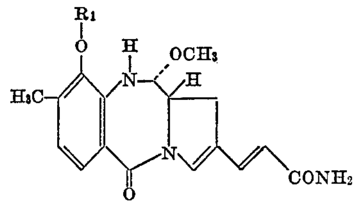

wherein $R_1$ is benzoyl or alkanoyl of from 1 to 6 carbon atoms inclusive with isopropenylacetate for about eight hours.

18. A process for the preparation of a compound of the formula:

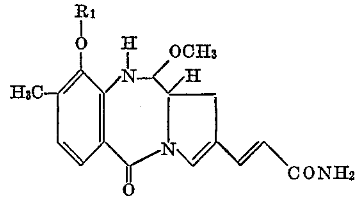

wherein $R_1$ is benzoyl or alkanoyl of from 1 to 6 carbon atoms inclusive, which comprises reacting a compound of the formula:

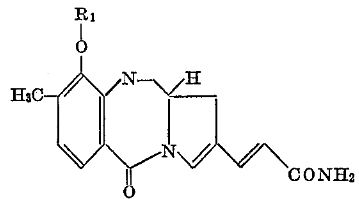

wherein $R_1$ is benzoyl or alkanoyl of from 1 to 6 carbon atoms inclusive, with methanol at room temperature.

19. A process for the preparation of a compound selected from the group consisting of:

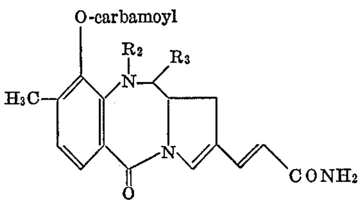

and

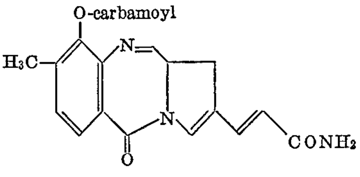

wherein carbamoyl is substituted on the nitrogen atom with phenyl or alkyl of from 1 to 6 carbon atoms inclusive; $R_2$ is selected from the group consisting of hydrogen, benzoyl and alkanoyl of from 1 to 6 carbon atoms inclusive; $R_3$ is selected from the group consisting of alkoxy of from 1 to 6 carbon atoms inclusive, hydroxy and alkanolyloxy of from 1 to 6 carbon atoms inclusive which comprises reacting the compound of the formula:

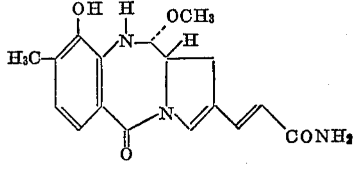

with an isocyanate dissolved in acetone and a tertiary amine, at a volume ratio of 2 volumes of isocyanate per volume of tertiary amine at room temperature for about 1 to 3 hours.

20. A process for the preparation of a compound selected from the group consisting of:

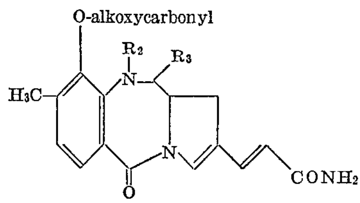

and

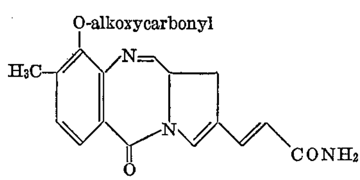

wherein the alkoxy on the carbonyl is of from 1 to 6 carbon atoms inclusive; $R_2$ is selected from the group consisting of hydrogen, benzoyl and alkanoyl of from 1 to 6 carbon atoms inclusive; $R_3$ is selected from the group consisting of alkoxy of from 1 to 6 carbon atoms inclusive, hydroxy and alkanoyloxy of from 1 to 6 carbon atoms inclusive, which comprises reacting for about 24 hours at room temperature the compound of the formula:

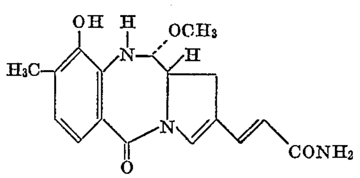

with a dialkyl ester of pyrocarbonic acid dissolved in a tertiary amine on a volume basis of about 1:8 to 1:10.

21. A process for the preparation of a compound of the formula:

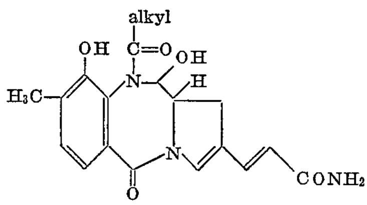

wherein the alkyl group is of from 1 to 6 carbon atoms inclusive, which comprises reacting a compound of the formula:

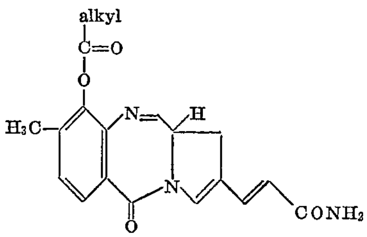

wherein the alkyl is of from 1 to 6 carbon atoms inclusive, with water in acetone on a volume basis of about 4:1, at room temperature.

22. A process for the preparation of a compound of the formula:

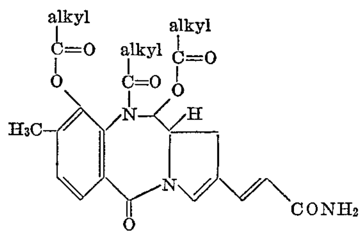

wherein the alkyls are of from 1 to 6 carbon atoms inclusive which comprises reacting the compound of the formula:

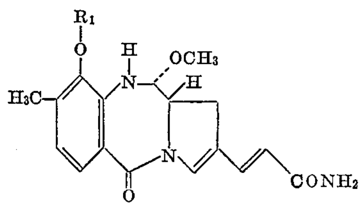

wherein $R_1$ is selected from the group consisting of benzoyl or alkanoyl of from 1 to 6 carbon atoms inclusive with an alkanoic acid anhydride in a pyridine solvent at room temperature for about 24 hours.

23. A process for the preparation of a compound of the formula:

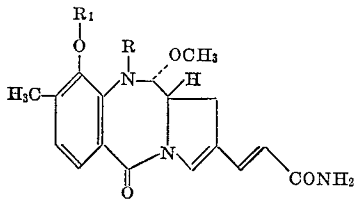

wherein $R_1$ is benzoyl or alkanoyl of from 1 to 6 carbon atoms inclusive, which comprises reacting the compound of the formula:

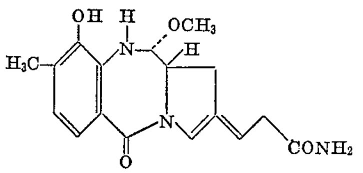

with an acid anhydride of the formula $(R_1)_2O$ dissolved in a tertiary amine on a volume basis of from 1:1 to 1:10 at a temperature of from about 40° C. to about 50° C. for from about 20 to 30 hours.

24. A process for the preparation of a compound of the formula:

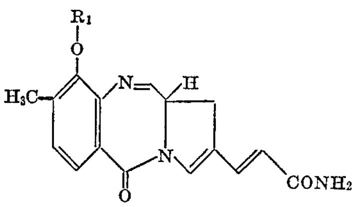

wherein $R_1$ benzoyl or alkanoyl of from 1 to 6 carbon atoms inclusive which comprises reacting a compound of the formula:

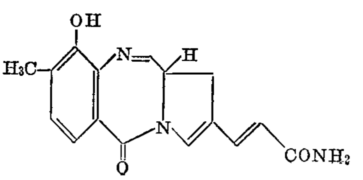

with an acid anhydride of the formula $(R_1)_2O$ dissolved in a tertiary amine on a volume basis of from 1:1 to 1:10 for from about 2 to about 24 hours to complete the reaction at temperatures of from about 20° C. to about 28° C. when $R_1$ is alkanoyl of from 1 to 6 carbon atoms inclusive and from about 75° C. to about 85° C. when $R_1$ is benzoyl.

25. A process for the preparation of a compound of the formula:

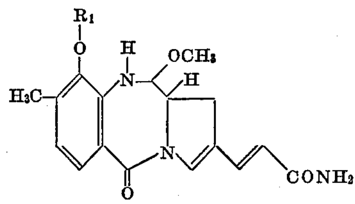

wherein $R_1$ benzoyl or alkanoyl of from 1 to 6 carbon atoms inclusive which comprises reacting a compound of the formula:

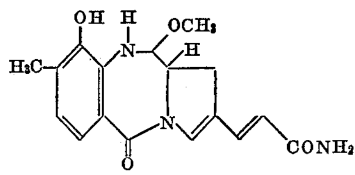

with an acid anhydride of the formula $(R_1)_2O$ dissolved in a tertiary amine on a volume basis of from 1:1 to 1:10 for from about 2 to 24 hours to complete the reaction at temperatures of from about 20° C. to about 28° C. when $R_1$ alkanoyl of from 1 to 6 carbon atoms inclusive and from about 75° C. to about 85° C. when $R_1$ is benzoyl.

26. A process for the preparation of a compound of the formula:

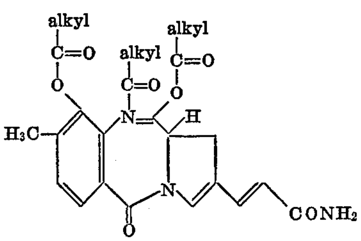

wherein the alkyls are of from 1 to 6 carbon atoms inclusive which comprises reacting a compound of the formula:

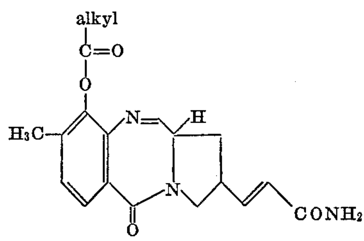

wherein the alkyl is from 1 to 6 carbon atoms inclusive dissolved in pyridine with a combination of 1 part by volume of an alkanoic acid and 15 parts by volume of the acid anhydride of the same acid, at room temperature for about from two to three days.

27. A process for the preparation of a compound of the formula:

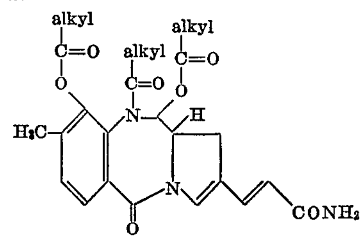

wherein the alkyl is from 1 to 6 carbon atoms inclusive which comprises reacting a compound of the formula:

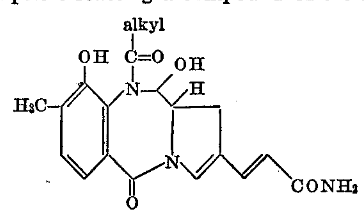

wherein the alkyl is from 1 to 6 carbon atoms inclusive dissolved in pyridine, with an alkanoic acid anhydride at room temperature for from about 2 to 3 days.

References Cited

UNITED STATES PATENTS 3,361,742 1/1968 Berger et al. ------ 260—239.3

OTHER REFERENCES

Leimgruber et al.. "J. Am. Chem. Soc." vol. 87, No. 24, Dec. 20, 1965, pp. 5793–5795.

HENRY R. JILES, Primary Examiner

R. T. BOND, Assistant Examiner

U.S. Cl. X.R.

424—274